(12) United States Patent
Hashiguchi (10) Patent No.: US 12,039,384 B2
(45) Date of Patent: Jul. 16, 2024

(54) CONNECTOR FOR ELECTRICALLY CONNECTING A MODULE SUBSTRATE AND A MAIN SUBSTRATE

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 18/218,924

(22) Filed: Jul. 6, 2023

(65) Prior Publication Data

US 2024/0062028 A1 Feb. 22, 2024

(30) Foreign Application Priority Data

Aug. 16, 2022 (JP) .................................. 2022-129694

(51) Int. Cl.
*G06K 13/06* (2006.01)
*H01R 12/89* (2011.01)
*H01R 13/629* (2006.01)

(52) U.S. Cl.
CPC ............. *G06K 13/06* (2013.01); *H01R 12/89* (2013.01); *H01R 13/62911* (2013.01)

(58) Field of Classification Search
CPC ... G06K 13/06; H01R 12/89; H01R 13/62911
USPC ........................................................ 235/486
See application file for complete search history.

(56) References Cited

FOREIGN PATENT DOCUMENTS

JP          3021370 B2       3/2000

*Primary Examiner* — Jamara A Franklin
(74) *Attorney, Agent, or Firm* — Greenblum & Bernstein, P.L.C.

(57) ABSTRACT

A connector electrically connecting a module substrate and a main substrate includes: a housing mounted on the main substrate; contacts held on the housing and including contact parts and connection parts connected to the main substrate; a frame including side board parts sandwiching a flat board part and the main substrate, the side board parts forming one of a cam groove and a projection; and a slider having opposite side portions forming the other of the cam groove and the projection, forming an insertion space between the slider and the housing upon the projection's insertion into the cam groove and the slider's attachment to the frame, pressing the module substrate against the contact parts upon the slider sliding in the module substrate's insertion direction, sandwiching main substrate, the housing and the module substrate between the slider and the flat board part.

11 Claims, 13 Drawing Sheets

CONNECTOR FOR ELECTRICALLY CONNECTING A MODULE SUBSTRATE AND A MAIN SUBSTRATE

TECHNICAL FIELD

The invention relates to a connector that electrically connects a substrate and a substrate.

BACKGROUND ART

Figure 1:
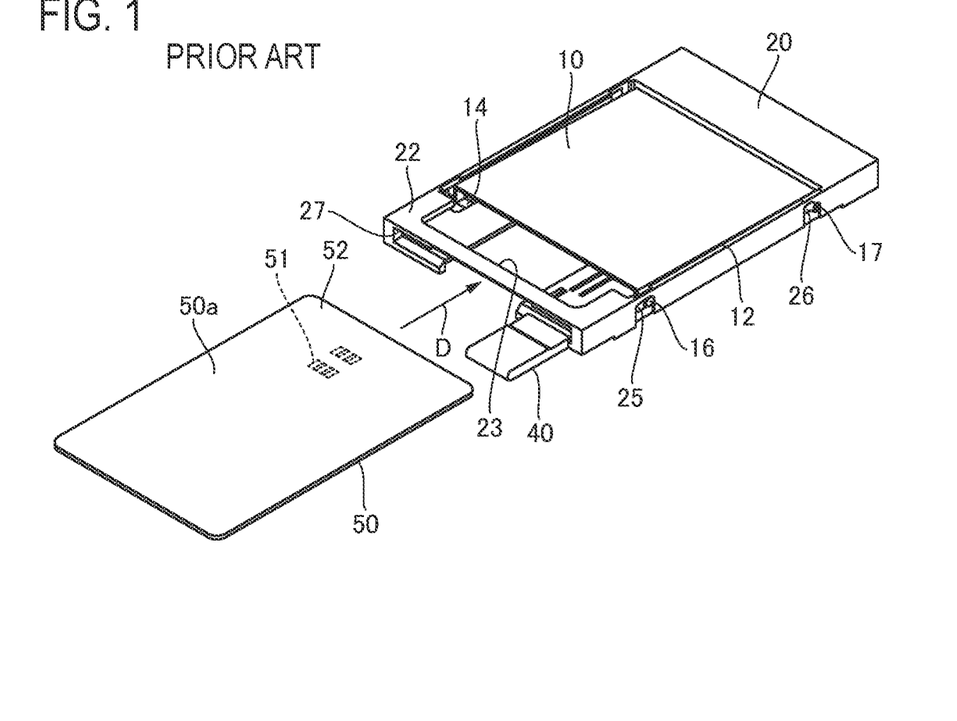
FIG. 1 is a perspective view showing a conventional card connector.
Figure 2:
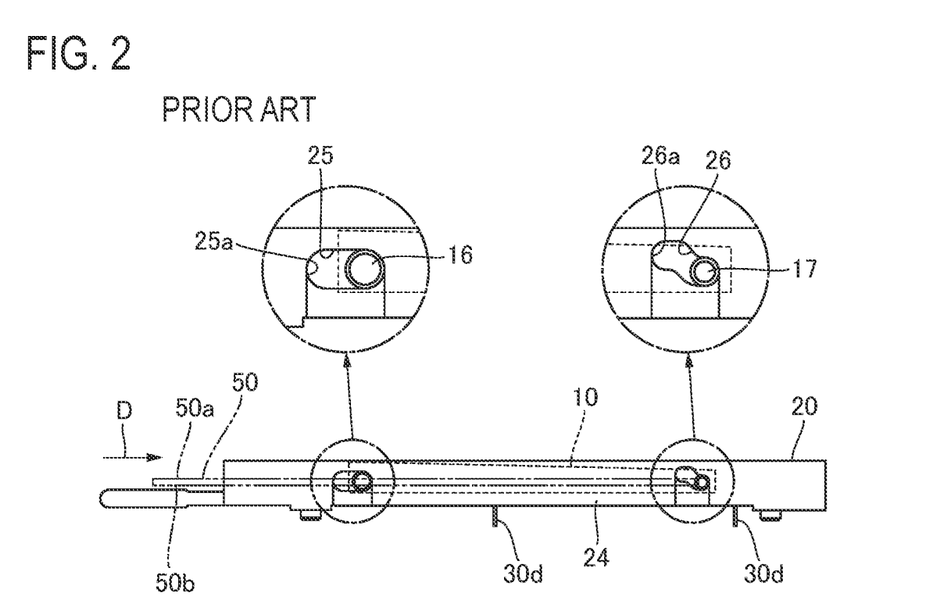
FIG. 2 is a side view of the card connector shown in FIG. 1.
Figure 3:
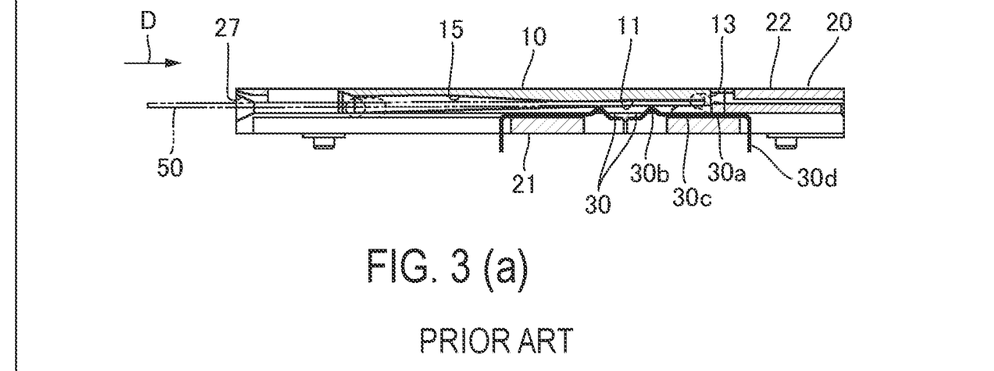
FIG. 3(a) is a longitudinal sectional view showing a state of the card connector shown in FIG. 1 before card insertion completion.
FIG. 3(b) is a longitudinal sectional view showing a state of the card connector shown in FIG. 1 at the time of card insertion completion.

FIGS. 1 to 3 show the configuration and operation of a card connector described in Japanese Registered Patent No. 3021370 (referred to as "Patent Literature 1" hereinafter), as a conventional example of the connector. The card connector includes a cover insulator 10, a base insulator 20, contacts 30, and an eject mechanism 40.

As shown in FIG. 3, the contact 30 is constituted by a fixation part 30a that is fixed to a lower surface part 21 of the base insulator 20, a contact point part 30b that can be brought into contact with a land 51 of an IC card 50, a spring part 30c that biases the contact point part 30b upward, and a terminal part 30d that is connected to an unillustrated printed substrate.

The cover insulator 10 includes a card support surface 11 that supports an upper surface 50a of the IC card 50, side surface parts 12 that support both side surfaces of the IC card 50, an abutment part 13 against which an insertion-directional distal end part 52 of the IC card 50 abuts, a support part 14 that supports both side edges of a lower surface 50b of the IC card 50, and a guide surface 15 that guides the IC card 50 to the abutment part 13. The card support surface 11 is positioned above the contact point parts 30b of the contacts 30, and faces a lower surface part 21 of the base insulator 20. On each side surface part 12, columnar projection parts 16, 17 are provided.

An opening 23 is formed on an upper surface part 22 of the base insulator 20, and cam grooves 25, 26 are formed on both side surface portions 24. The cam groove 25 is positioned on a rear side in a card insertion direction D, and the cam groove 26 is positioned on a front side in the card insertion direction D. The longitudinal direction of the cam groove 25 is parallel to the card insertion direction D, and the cam groove 25 guides the projection part 16. The longitudinal direction of the cam groove 26 is inclined with respect to the card insertion direction D, and the cam groove 26 guides the projection part 17 obliquely. Accordingly, the cover insulator 10 can move between a first position close to the contact point parts 30b of the contacts 30 and a second position far from the contact point parts 30b of the contacts 30.

In the card connector, before the IC card 50 is inserted, the projection parts 16, 17 of the cover insulator 10 are respectively positioned at a rear-side end part 25a of the cam groove 25 and a rear-side end part 26a of the cam groove 26 in the base insulator 20. When the IC card 50 is inserted into a card insertion slot 27 of the base insulator 20 in this state, both side edges of the lower surface 50b of the IC card 50 are supported by the support part 14 of the cover insulator 10, and the IC card 50 is guided to the abutment part 13 while being parallel to the card insertion direction D. The lower surface 50b of the IC card 50 is positioned above the contact point parts 30b of the contacts 30, and the IC card 50 does not contact with the contact point parts 30b of the contacts 30 (see FIG. 3(a)).

When the IC card 50 is inserted beyond a predetermined insertion amount (an insertion amount until the IC card 50 reaches the abutment part 13 of the cover insulator 10), the distal end part 52 of the IC card 50 abuts against the abutment part 13 of the cover insulator 10, and thereafter the projection part 17 of the cover insulator 10 is guided along the cam groove 26 obliquely downward, so that a card insertion-directional distal end side of the cover insulator 10 comes close to the lower surface part 21 of the base insulator 20. The upper surface 50a of the IC card 50 is pressed downward by the card support surface 11, and therefore the land 51 of the IC card 50 comes into contact with the contact point parts 30b of the contacts 30 (see FIGS. 2 and 3(b)). As a result, the IC card 50 and the printed substrate are electrically connected.

SUMMARY OF THE INVENTION

In the above-described card connector, when the IC card 50 is inserted, the distal end part 52 of the IC card 50 abuts against the abutment part 13 of the cover insulator 10. Thereafter, the cover insulator 10 is pressed by the IC card 50, and is moved from the second position to the first position while the projection parts 16, 17 are guided by the cam grooves 25, 26 of the base insulator 20. The distance in which the IC card 50 slides is a short distance in which the cover insulator 10 is moved from the second position up to the first position.

In Patent Literature 1, the distance in which the IC card 50 slides on the contacts 30 upon insertion of the IC card 50 is shortened in this way, and thereby the damage of the IC card 50 and the wear of the contact point parts 30b of the contacts 30 at the time of the insertion or removal of the IC card 50 are prevented.

However, in the configuration described in Patent Literature 1, it can be said that the prevention of the wear and the damage remains insufficient in that the insertion of the IC card 50 causes the state of the sliding between the IC card 50 and the contacts 30, and it can be said that there is room for improvement.

In view of this point, an object of the invention is to provide a connector that makes it possible to further prevent the wear of contacts and the wear of electrodes of a module substrate that come into contact with the contacts upon insertion of the module substrate, compared to the conventional example.

According to a mode for carrying out the invention, a connector for electrically connecting a module substrate and a main substrate, the module substrate comprising a plurality of electrodes arrayed lengthwise and breadthwise on one surface of the module substrate, the connector comprises: a flattened housing being mounted on the main substrate; a plurality of contacts being arrayed and held on the flattened housing so as to correspond to the electrodes of the module substrate, the contacts comprising contact parts protruding from an opposing surface of a main substrate mount surface of the flattened housing and connection parts being connected to the electrodes of the main substrate; a frame comprising a flat board part positioned on the opposite side of the main substrate to the housing mount surface and a pair of side board parts standing from the flat board part to sandwich the flattened housing mounting portion of the main substrate, and in which one of a cam groove and a projection constituting a cam mechanism is formed on the pair of side board parts; and a slider comprising a tabular shape, the other of the cam groove and the projection constituting the cam mechanism being formed at a pair of opposite side portions of the slider, the slider forming an insertion space for the module substrate between the slider and the flattened housing mounted on the main substrate when the projection is inserted into the cam groove and the slider is attached to the frame, wherein the slider comprises a structure in which when the slider slides in the same direction as a direction of insertion of the module substrate into the insertion space, the slider is displaced in a direction in which the module substrate inserted into the insertion space is pressed against the contact parts by the cam mechanism, and the main substrate, the flattened housing and the module substrate are sandwiched between the slider and the flat board part.

Effects of the Invention

According to the mode for carrying out the invention, it is possible to prevent the wear of contacts and the wear of electrodes of a module substrate that come into contact with the contacts upon insertion of the module substrate, compared to the conventional example, and consequently it is possible to obtain a long-life connector.

Furthermore, because of the structure in which the housing holding the main substrate and the module substrate that are connected is sandwiched between the frame and the slider, it is possible to prevent the deflection of the main substrate and the module substrate, and thereby it is possible to obtain a suitable contact force between the electrodes of the module substrate and the contacts.

DETAILED DESCRIPTION OF THE EMBODIMENTS

A mode for carrying out the invention will be described with embodiments with reference to the drawings.

First Embodiment

FIG. 4 shows the external appearance of a first embodiment of a connector according to a mode for carrying out the invention, and FIG. 4 shows a state where a connector 100 is attached to a main substrate 200. As for the main substrate 200, only a portion where the connector 100 is attached is illustrated, and the other portion is not illustrated.

Figure 4A:
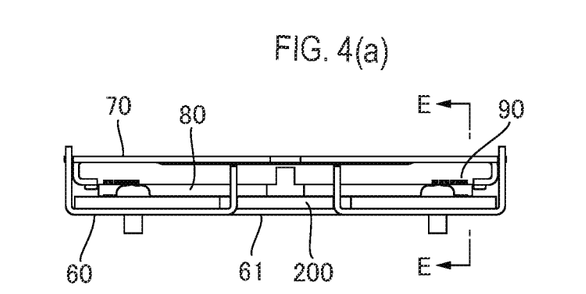
FIG. 4(a) is an elevational view showing a state where a first embodiment of a connector according to a mode for carrying out the invention is attached to a main substrate.
Figure 4B:
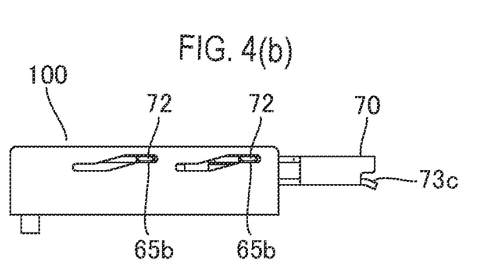
FIG. 4(b) is a side view of the state.
Figure 4C:
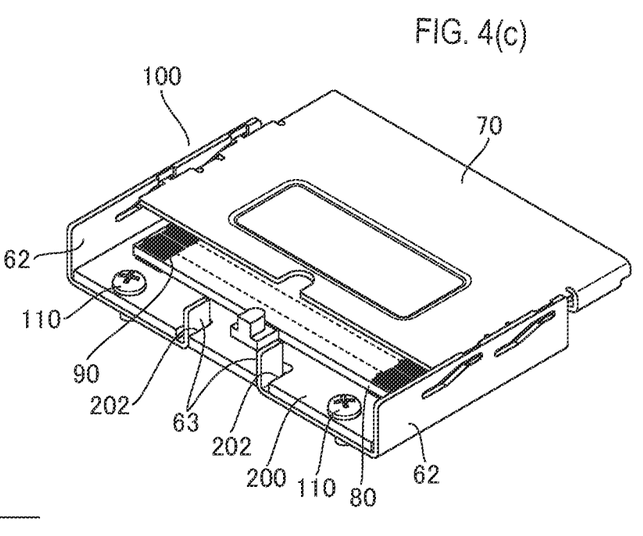
FIG. 4(c) is a perspective view of the state as viewed from a forward side.
Figure 4D:
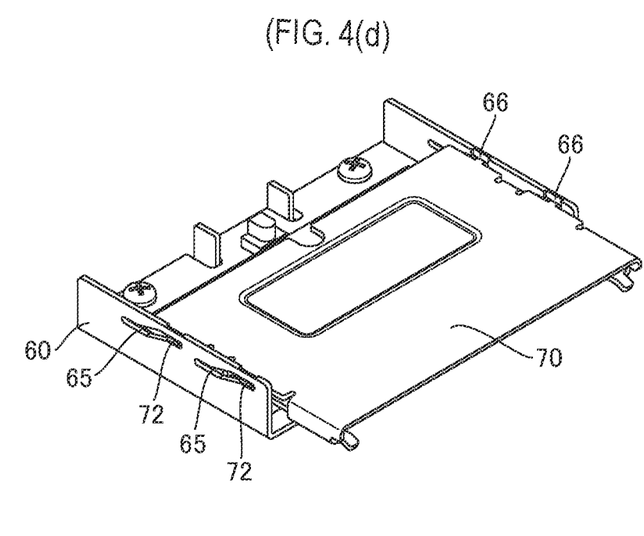
FIG. 4(d) is a perspective view of the state as viewed from a rearward side.
Figure 5:
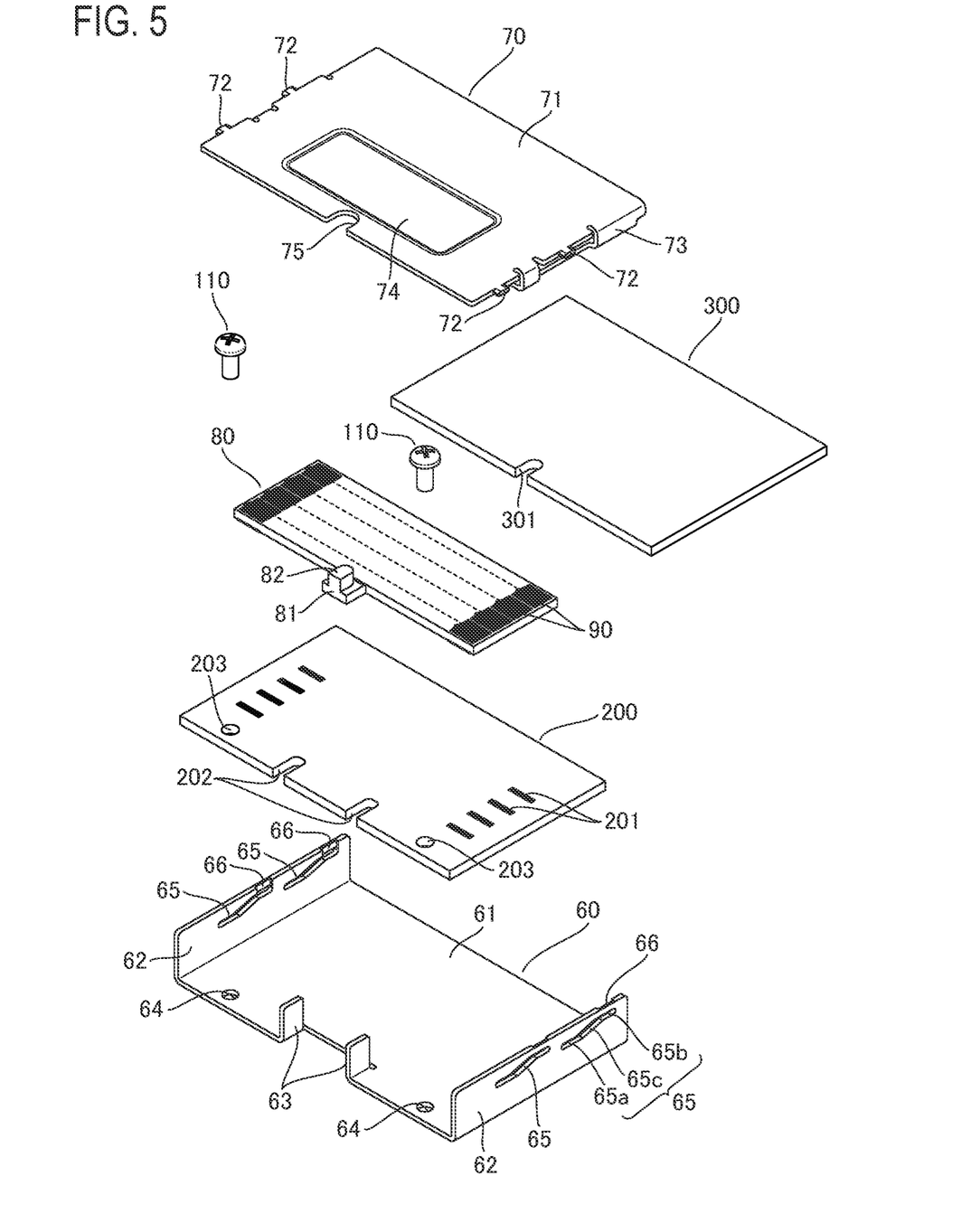
FIG. 5 is an exploded perspective view of the connector shown in FIG. 4, and shows also the main substrate and a module substrate.

The connector 100 is constituted by a frame 60, a slider 70, a housing 80 and many contacts 90. FIG. 5 shows parts into which the configuration shown in FIG. 4 is divided, and shows also a module substrate 300 that is electrically connected with the main substrate 200 by the connector 100. First, the configuration of each part will be described.

The frame 60 is made of a metal board, and includes a flat board part 61 that has a rectangular shape, and a pair of side board parts 62 that stand from both right-left-directional ends of the flat board part 61. A pair of protrusion pieces 63 that rise upward and face each other are formed at the center of a front end portion of the flat board part 61, and furthermore, screw holes 64 are respectively formed on right and left sides of the front end portion.

On each of the pair of side board parts 62, two cam grooves 65 are formed so as to be arrayed in a front-rear direction. The cam groove 65 is formed as a hole that passes through the side board part 62, extends parallel to a board surface of the flat board part 61, and has a shape in which two elongate holes 65a, 65b positioned so as to deviate in a top-bottom direction are coupled to each other by an elongate hole 65c inclined with respect to the board surface of the flat board part 61. The elongate hole 65a on the front side of the cam groove 65 is positioned so as to be closer to the flat board part 61 than the elongate hole 65b on the rear side is. A concave part 66 that reaches the elongate hole 65b from an upper end of the side board part 62 is formed on each of mutually facing inner side surfaces of the pair of side board parts 62.

Figure 6A:
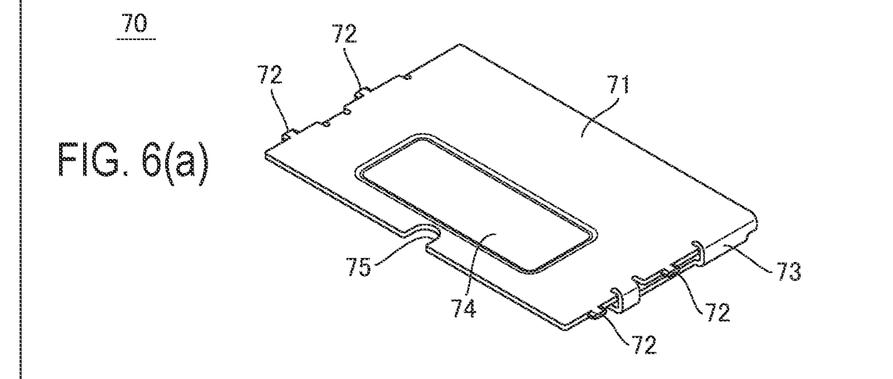
FIG. 6(a) is a perspective view of a slider in FIG. 4 as viewed from a forward side.
Figure 6B:
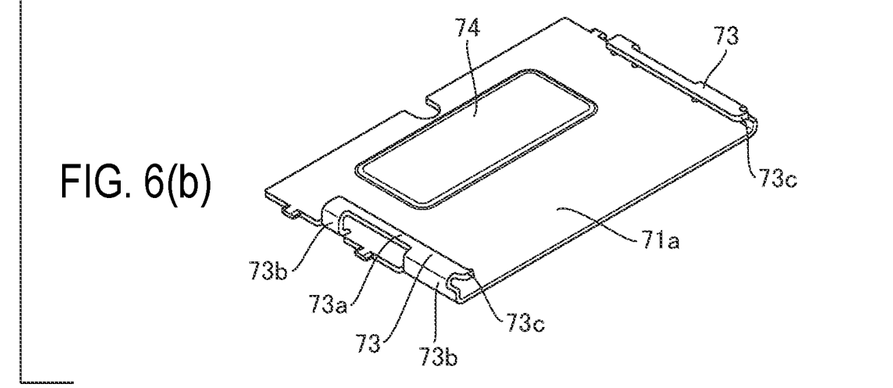
FIG. 6(b) is a perspective view of the slider in FIG. 4 as viewed from rearward side.

The slider 70 is made of a metal board, includes a rectangular board part 71, and has a tabular shape. Two projections 72 that protrude outward are formed at each of a pair of opposite side portions that are positioned at both right-left-directional ends of the board part 71, and furthermore, guide parts 73 are formed.

As shown in FIG. 6(b), the guide part 73 is constituted by an elongated support piece 73a that extends in the front-rear direction while facing a back surface 71a of the board part 71 and two extension pieces 73b that are folded so as to be extended from the board part 71 and that reach the support piece 73a. An introduction piece 73c that is extended in a direction of being away from the back surface 71a of the board part 71 is formed at a rear end of the support piece 73a. A step part 74 is formed so as to protrude in a rectangular island shape, on the back surface 71a side of the board part 71, and a cutout 75 is formed at a central part of the front end.

Figure 7:
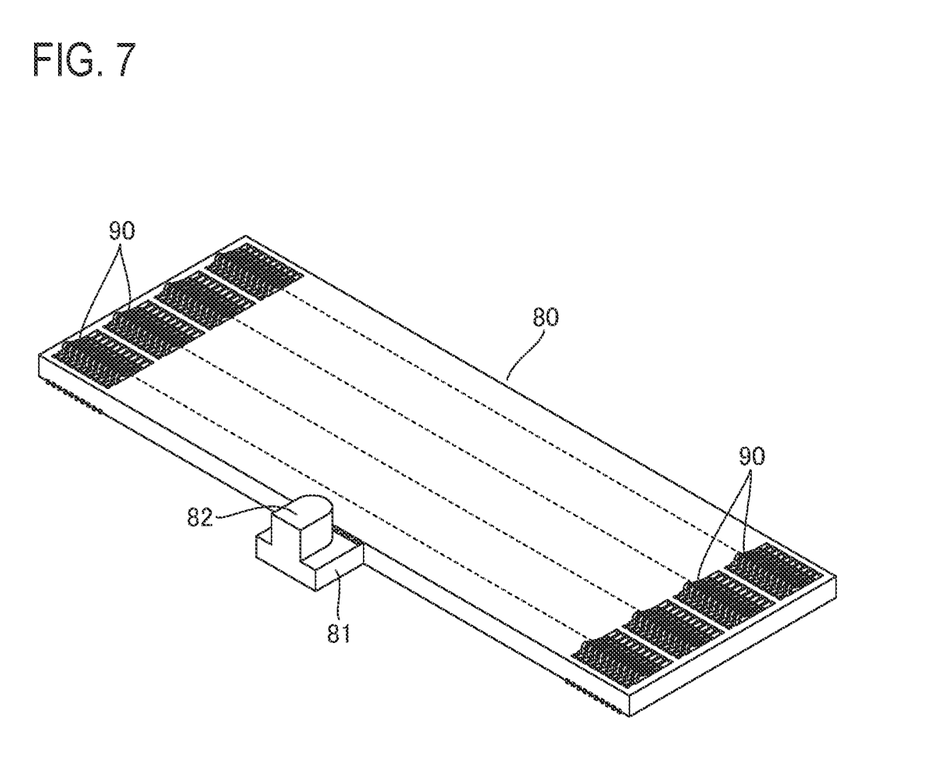
FIG. 7 is an enlarged perspective view of a housing holding contacts in FIG. 5.
Figure 8A:
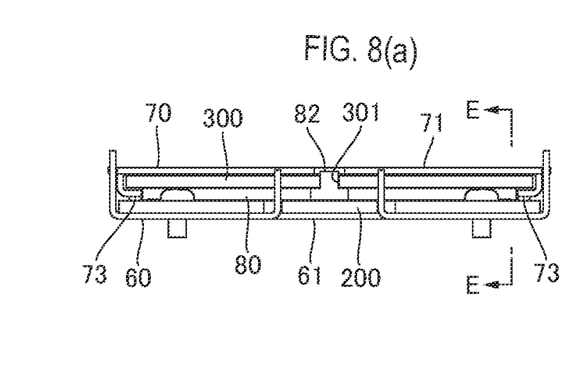
FIG. 8(a) is an elevational view showing a state where the module substrate is inserted into the connector shown in FIG. 4.
Figure 8B:
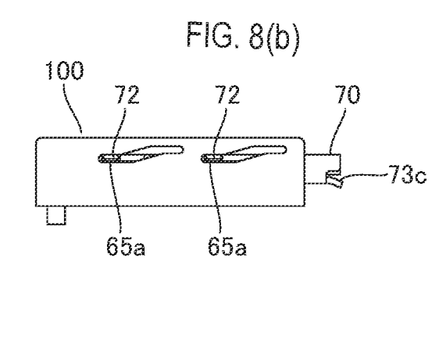
FIG. 8(b) is a side view of the state.
Figure 8C:
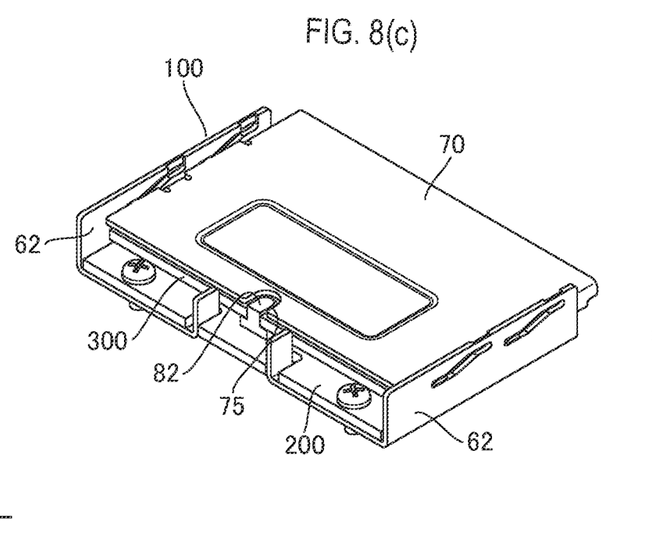
FIG. 8(c) is a perspective view of the state as viewed from a forward side.
Figure 8D:
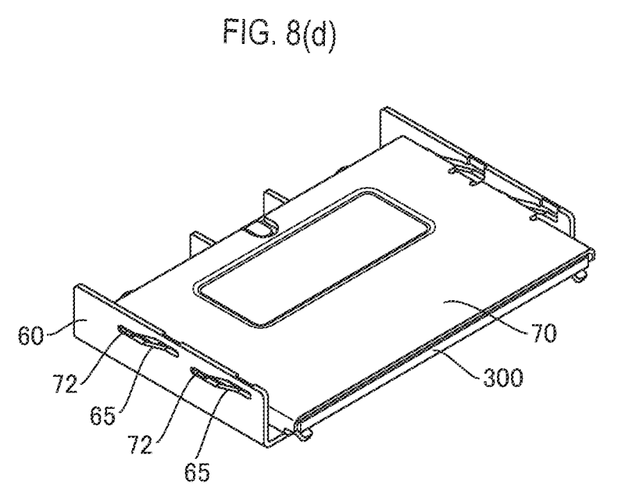
FIG. 8(d) is a perspective view of the state as viewed from a rearward side.

The housing 80 is made of resin, and has a flattened shape. In the housing 80, the many contacts 90 are held so as to be arrayed lengthwise and breadthwise. In FIG. 4, FIG. 5 and FIG. 7 in which FIG. 5 is enlarged, only contacts 90 positioned at both right-left-directional end portions of the housing 80 are illustrated, and contacts 90 positioned at a muddle portion are not illustrated. The contacts 90 are arrayed so as to correspond to many electrodes (which do not appear in FIG. 5) that are arrayed lengthwise and breadthwise on one surface of the module substrate 300.

An extension part 81 that protrudes forward is formed at the center of a front end of the housing 80, and on the extension part 81, a convex part 82 is formed so as to protrude upward. A cutout 301 into which the convex part 82 is fit is formed at a front end of the module substrate 300.

Many electrodes 201 to which the contacts 90 are connected are arrayed and formed on the main substrate 200 to which the connector 100 is attached. As for the main substrate 200, only electrodes 201 positioned at both right-left-directional end portions are illustrated, and electrodes 201 positioned at a middle portion are not illustrated. Two cutouts 202 are formed at a front end of the main substrate 200, and furthermore, holes 203 are formed on the respective outsides of the cutouts 202.

Next, the assembly of the connector 100 and the attachment to the main substrate 200 will be described.

First, the housing 80 holding the contacts 90 is mounted on the main substrate 200 by surface mount. The contacts 90 and the electrodes 201 of the main substrate 200 are connected by soldering.

Next, the main substrate 200 is mounted on the flat board part 61 of the frame 60 while the positioning is performed, and two screws 110 are inserted into the holes 203 of the main substrate 200 and the screw holes 64 of the frame 60, so that the frame 60 is screwed and fixed to the main substrate 200. The positioning between the main substrate 200 and the frame 60 is performed by fitting the two protrusion pieces 63 of the frame 60 into the two cutouts 202 of the main substrate 200.

Next, the slider 70 is attached to the frame 60. The attachment is performed by inserting the two projections 72 formed at the pair of opposite side portions of the slider 70 into the cam grooves 65 formed on the pair of side board parts 62 of the frame 60 from the concave parts 66 respectively.

Accordingly, the assembly of the connector 100 and the attachment to the main substrate 200 are completed, and the configuration shown in FIG. 4 is obtained. As shown in FIG. 4, the flat board part 61 of the frame 60 is positioned on the opposing surface of the surface of the main substrate 200 on which the housing 80 is mounted, and the pair of side board parts 62 is positioned so as to sandwich the portion of the main substrate 200 on which the housing 80 is mounted.

FIG. 8 shows a state where the module substrate 300 is inserted into the above-described connector 100 and where the module substrate 300 and the main substrate 200 are electrically connected, and the operation of the insertion and connection of the module substrate 300 in the connector 100 will be described below.

Figure 9A:
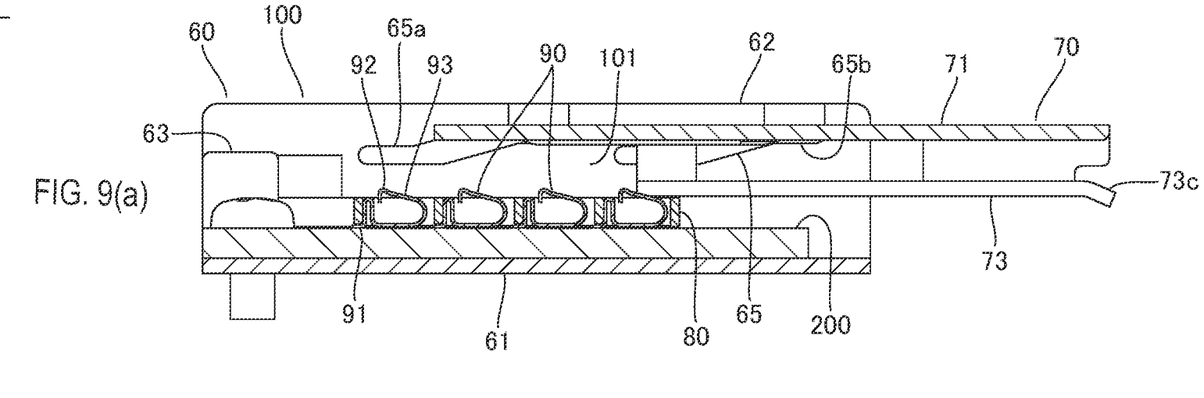
FIG. 9(a) is an E-E line enlarged sectional view of FIG. 4(a)

FIG. 9(a) shows a section (a section in the state shown in FIG. 4) before the insertion of the module substrate 300, and the slider 70 protrudes from the frame 60 rearward to a large extent, while the projections 72 inserted into the cam grooves 65 of the frame 60 are positioned on the rear end sides of the cam grooves 65, that is, in the elongate holes 65b. The board part 71 of the slider 70 is parallel to the housing 80 and the main substrate 200, and an insertion space 101 for the module substrate 300 is formed between the board part 71 of the slider 70 and the housing 80.

One end of the contact 90 held by the housing 80 is a connection part 91 that is connected to the electrode 201 of the main substrate 200, and the connection part 91 is connected to the electrode 201 by soldering although the electrode 201 is not illustrated in FIG. 9(a). The other end of the contact 90 is a contact part 92 that comes into contact with the electrode of the module substrate 300 to be inserted into insertion space 101, and protrudes from the upper surface (the opposing surface of the main substrate mount surface) of the housing 80. The contact 90 includes a spring part 93 that is bent in a U-shape, and the contact part 92 is a free end side of the spring part 93. The contact part 92 extends in the insertion direction of the module substrate 300.

The module substrate 300 is inserted between the board part 71 of the slider 70 and the guide part 73. As for the module substrate 300, both width-directional (right-left-directional) side edge parts of one surface (lower surface) on which the electrodes are arrayed are supported by the guide parts 73 respectively, and the insertion into the insertion space 101 is guided. The module substrate 300 is supported and guided by the guide parts 73 in this way, and thereby is inserted without making contact with the contacts 90.

The front end of the module substrate 300 inserted into the insertion space 101 abuts against the pair of protrusion pieces 63 of the frame 60, and thereby further insertion is restricted. Furthermore, the cutout 301 formed at the insertion-directional front end is fit to the convex part 82 provided on the housing 80, and thereby the positioning in the right-left direction (width direction) is performed.

Figure 9B:
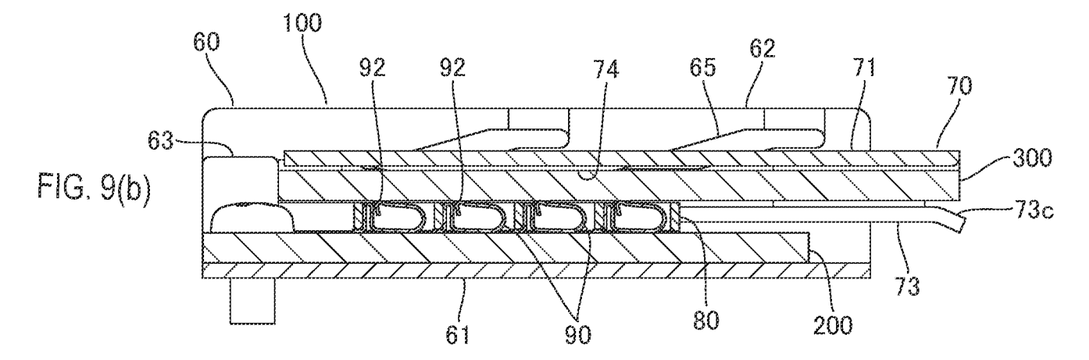
FIG. 9(b) is an E-E line enlarged sectional view of FIG. 8(a)

After the insertion of the module substrate 300, the slider 70 is slid in the same direction as the insertion direction of the module substrate 300. The projections 72 of the slider 70 move along the cam grooves 65 of the frame 60, and reach the front end sides of the cam grooves 65, that is, the elongate holes 65a. Accordingly, the slider 70 is displaced in a direction in which the module substrate 300 inserted into the insertion space 101 is pressed against the contact parts 92 of the contacts 90, and the electrodes of the module substrate 300 and the contacts 90 come into contact with each other and are electrically connected. FIG. 9(b) shows this state. The cutout 75 formed at the front end of the slider 70 is an escape space for the convex part 82 of the housing 80, and the convex part 82 of the housing 80 and the slider 70 do not interfere with each other.

As shown in FIG. 9(b), since the slider 70 is displaced as described above, the connector 100 has a structure in which the main substrate 200, the housing 80 and the module substrate 300 are sandwiched between the slider 70 and the flat board part 62 of the frame 60. Since this sandwiching structure is employed, it is possible to prevent, for example, the main substrate 200 from deflecting due to the displacement (press) of the slider 70.

The first embodiment of the connector according to the mode for carrying out the invention has been described above. According to the above-described connector 100, it is possible to obtain the following effects.

(1) Unlike the conventional example, the slider 70 does not include the abutment part against which the inserted module substrate 300 abuts, that is, the module substrate 300 does not slide integrally with the slider 70, and after the module substrate 300 is inserted to the predetermined position, it is possible to press the module substrate 300 against the contact parts 92 of the contacts 90, by sliding the slider 70. Consequently, unlike the conventional example, the insertion of the module substrate 300 does not cause the sliding between the module substrate 300 and the contacts 90. Accordingly, it is possible to prevent the wear of the contacts 90 and the electrodes of the module substrate 300, compared to the conventional example, and it is possible to restrain the increase in contact resistance due to the wear. Accordingly, it is possible to increase the life of the connector, compared to the conventional example.

(2) In the state where the insertion and connection of the module substrate 300 are completed, it is possible to prevent the deflection of the main substrate 200 because of the above-described sandwiching structure, and therefore it is possible to prevent the contact force of the contacts 90 from decreasing due to the deflection of the main substrate 200.

(3) The step part 74 provided on the slider 70 so as to protrude in a rectangular island shape limits the range of the contact between the slider 70 and the module substrate 300, and concentrates the pressing force to the module substrate 300. This prevents the warp of the module substrate 300 in the state where the connection of the module substrate 300 is completed, and gives a suitable contact force between the electrodes of the module substrate 300 and the contacts 90.

(4) The withdrawal of the module substrate 300 from the connector 100 is performed by sliding the slider 70 in the opposing direction of the direction at the time of the insertion and moving the module substrate 300 in a direction of being away from the contacts 90. At this time, there is a possibility that the module substrate 300 moves together with the slider 70. However, in this embodiment, since the contact parts 92 of the contacts 90 extend in the insertion direction of the module substrate 300, the contact parts 92 move in the same direction as the movement direction of the module substrate 300, even when the module substrate 300 moves together with the slider 70, and therefore, it is possible to restrain the amount of the sliding between the contacts 90 and the module substrate 300.

Second Embodiment

Figure 10A:
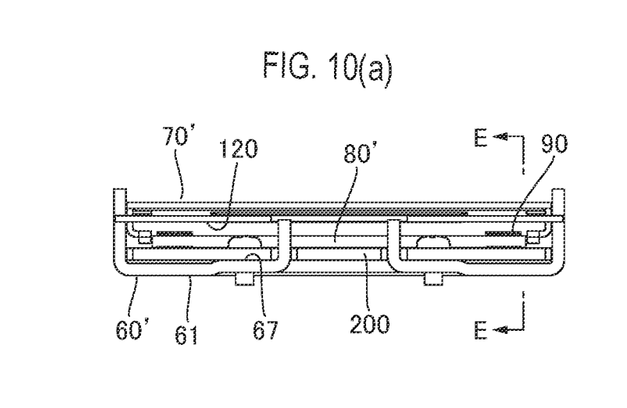
FIG. 10(a) is an elevational view showing a state where a second embodiment of the connector according to the mode for carrying out the invention is attached to the main substrate.
Figure 10B:
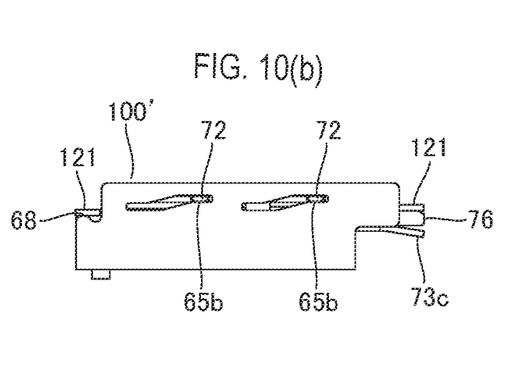
FIG. 10(b) is a side view of the state.
Figure 10C:
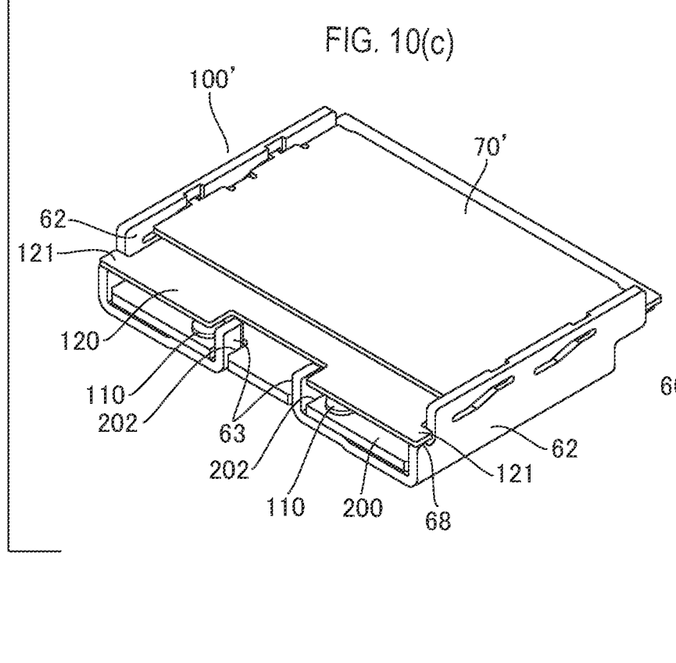
FIG. 10(c) is a perspective view of the state as viewed from a forward side.
Figure 10D:
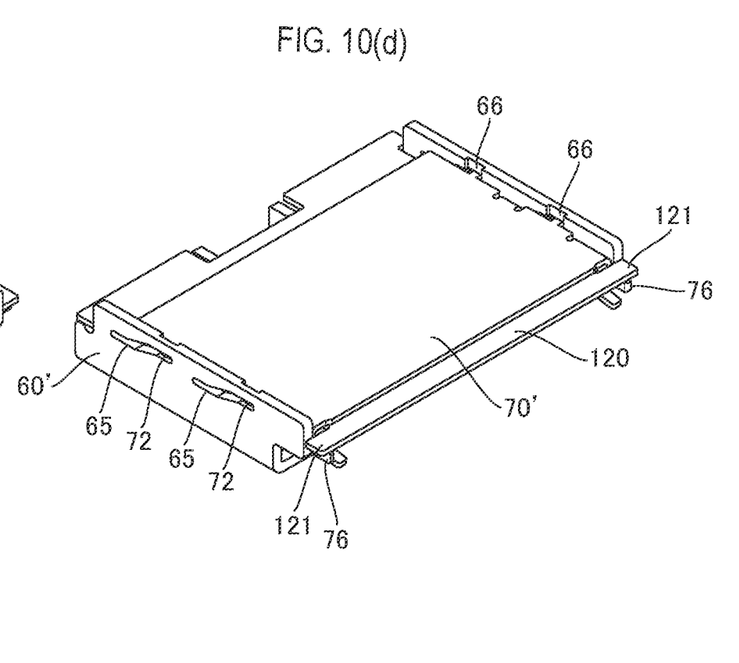
FIG. 10(d) is a perspective view of the state as viewed from a rearward side.
Figure 11:
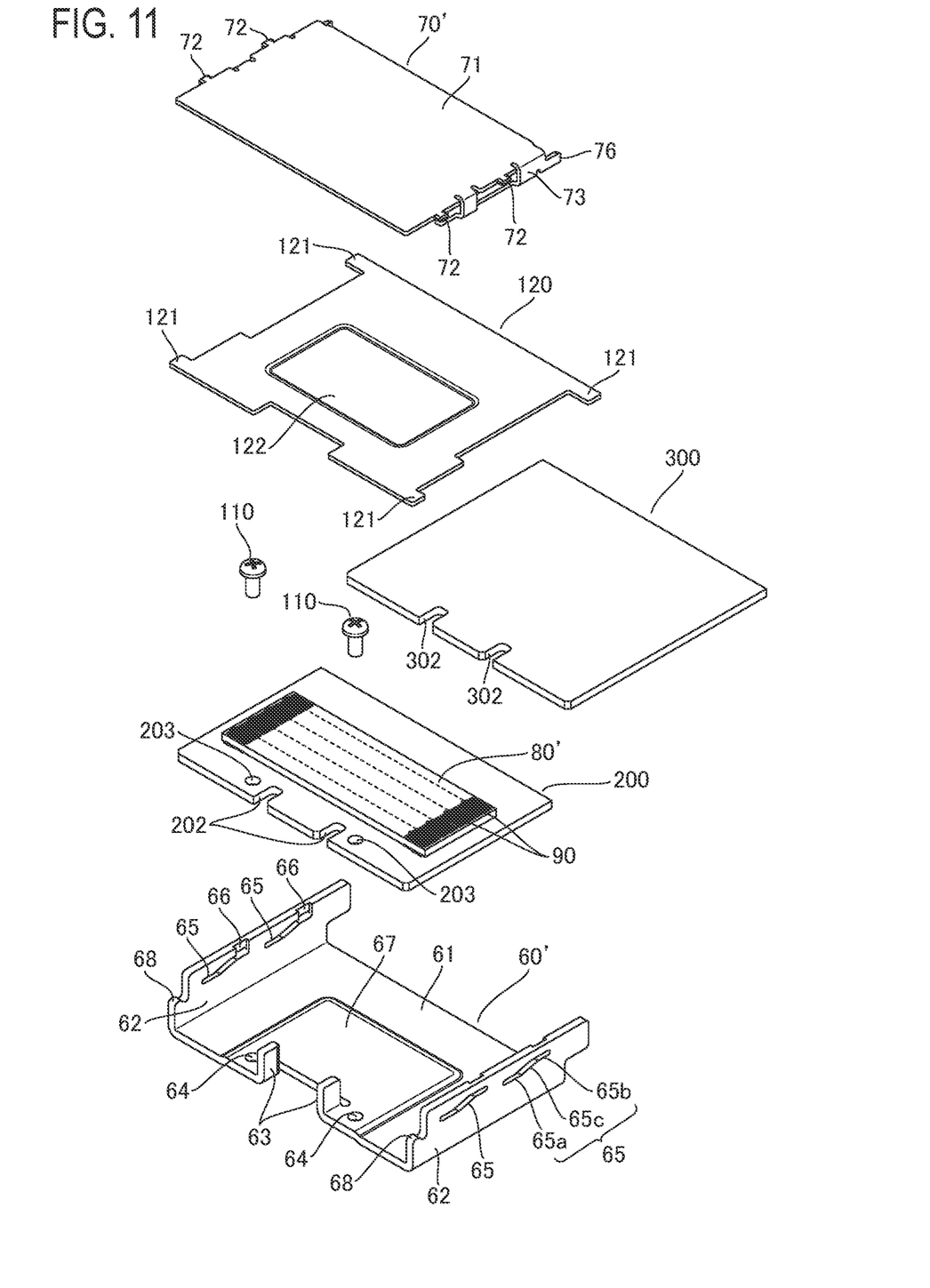
FIG. 11 is an exploded perspective view of the connector shown in FIG. 10, and shows also the main substrate and the module substrate.

FIG. 10 shows the external appearance of a second embodiment of the connector according to the mode for carrying out the invention, similarly to FIG. 4, and FIG. 11 shows parts into which the configuration shown in FIG. 10 is divided, similarly to FIG. 5. Portions corresponding to those in the first embodiment are denoted by identical reference characters, and detailed descriptions thereof are omitted.

In this embodiment, a connector 100' is provided with a plate 120 in addition to the configuration of the connector 100 in the first embodiment, and accordingly shapes of other components also are partially different.

The plate 120 has a roughly rectangular tabular shape, and at four corner parts, protrusion parts 121 are respectively formed so as to protrude. As for the step part 74 formed on the slider 70 in the first embodiment, in this embodiment, a step part 122 corresponding to the step part 74 is formed not on the plate 70' instead of a slider 120.

Figure 12A:
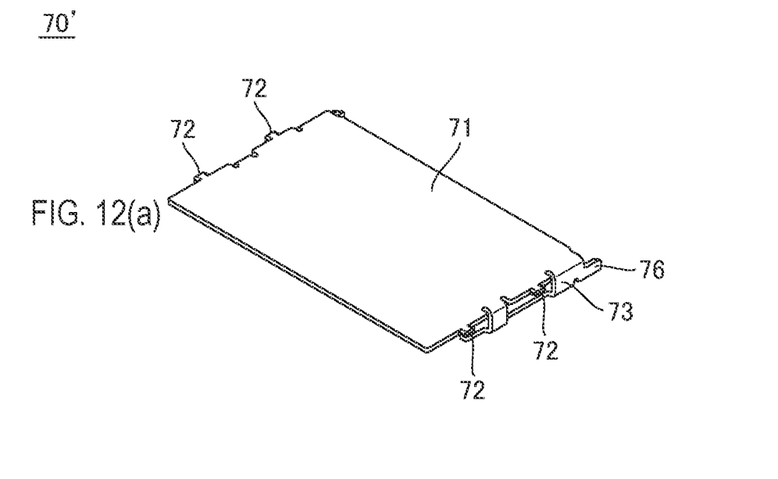
FIG. 12(a) is a perspective view of a slider in FIG. 10 as viewed from a forward side.
Figure 12B:
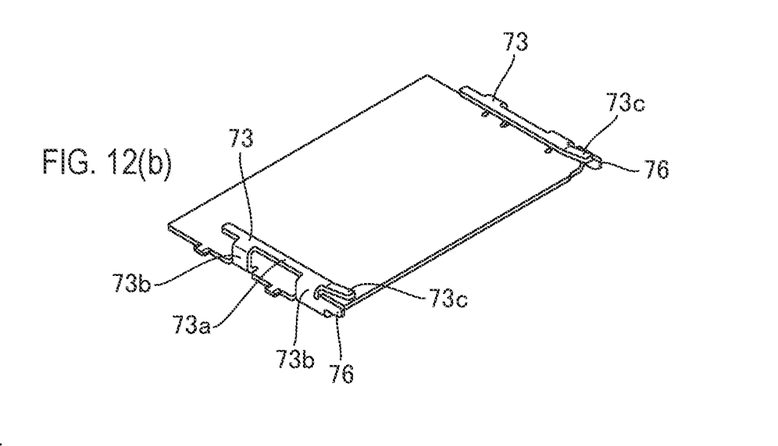
FIG. 12(b) is a perspective view of the slider in FIG. 10 as viewed from a rearward side.
Figure 13A:
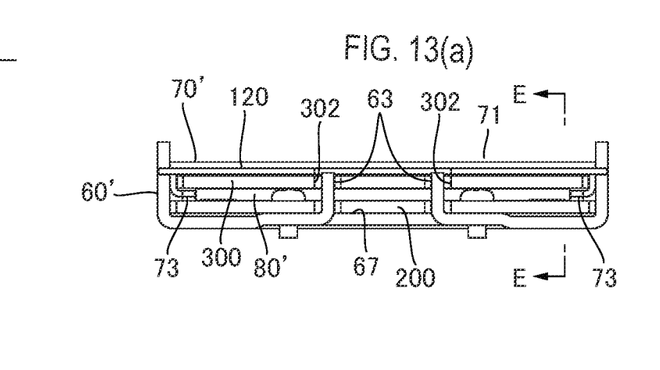
FIG. 13(a) is an elevational view showing a state where the module substrate is inserted into the connector shown in FIG. 10.
Figure 13B:
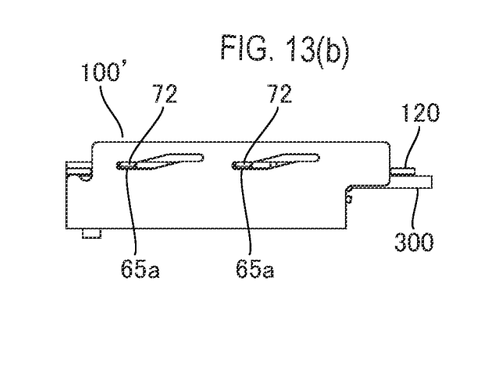
FIG. 13(b) is a side view of the state.
Figure 13C:
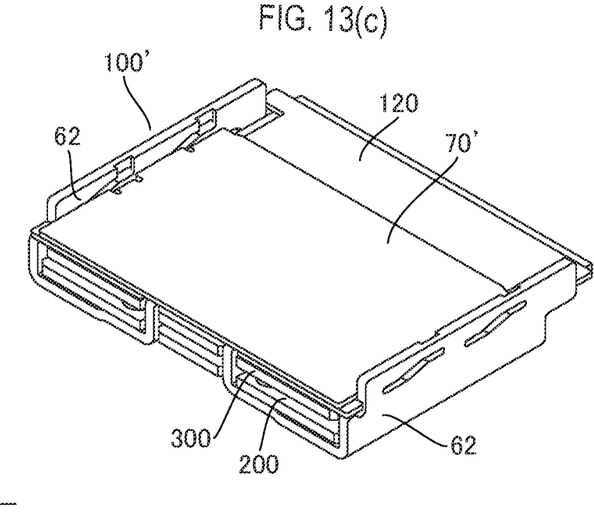
FIG. 13(c) is a perspective view of the state as viewed from a forward side.
Figure 13D:
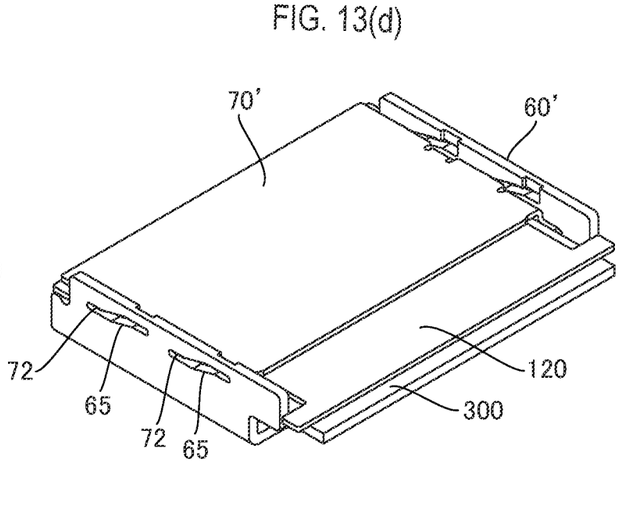
FIG. 13(d) is a perspective view of the state as viewed from a rearward side.

On the slider 70', at the rear ends of the pair of opposite side portions where the guide parts 73 are formed, support parts 76 are respectively formed so as to protrude rearward similarly to the introduction pieces 73c. As shown in FIG. 12(b), the support part 76 is formed such that the plate surface of the extension piece 73b that is of the two extension pieces 73b and that is positioned on the rear side is extended.

In this embodiment, unlike the housing 80 in the first embodiment, a housing 80' does not include the convex part 82 for the positioning of the module substrate 300, and the positioning of the module substrate 300 in the right-left direction is performed by two protrusion pieces 63 that are provided at a frond end of a flat board part 61 of a frame 60'. On the module substrate 300, two cutouts 302 into which the two protrusion pieces 63 are fit are formed at an insertion-directional front end.

In this embodiment, the two protrusion pieces 63 of the frame 60' function as stoppers against which the inserted module substrate 300 abuts, and furthermore function for the positioning of the module substrate 300 in addition to the positioning of the main substrate 200. It is possible to enhance the strength of the positioning part, by using the metal protrusion pieces 63 of the frame 60' for the positioning of the module substrate 300 instead of the resin convex part 82 formed on the housing 80 in this way.

In this embodiment, on the flat board part 61 of the frame 60', a step part 67 is formed so as to protrude in a rectangular island shape, on the surface side on which the main substrate 200 is mounted, and cutouts 68 are formed at front ends of a pair of side board parts 62, respectively.

The attachment of the slider 70' and plate 120 in the connector 100' to the frame 60' is performed by placing the slider 70' over the plate 120, assembling the slider 70' and the plate 120 such that the support parts 76 of the slider 70' are respectively put under the two protrusion parts 121 positioned rearward on the plate 120, and in this state, attaching the slider 70' to the frame 60'.

By attaching the slider 70' and the plate 120 as described above, the connector 100' is completed, and the configuration shown in FIG. 10 is obtained. The plate 120 is positioned between the pair of side board parts 62, such that the two protrusion parts 121 positioned forward are respectively positioned on the cutouts 68 at the front ends of the pair of side board parts 62 and the two protrusion parts 121 positioned rearward are respectively positioned on the support parts 76 of the slider 70'.

The positioning of the plate 120 in the right-left direction is performed while the plate 120 is sandwiched between the pair of the side board parts 62, and the positioning of the plate 120 in the front-rear direction is performed by the frame 60' while the two protrusion parts 121 in the front-rear direction sandwich the side board part 62 as shown in FIG. 10. The positioning in the right-left direction and the front-rear direction is performed with some backlash.

FIG. 13 shows a state where the module substrate 300 is inserted into the connector 100' and where the module substrate 300 and the main substrate 200 are electrically connected, and the operation of the insertion and connection of the module substrate 300 in the connector 100' will be described below.

Figure 14A:
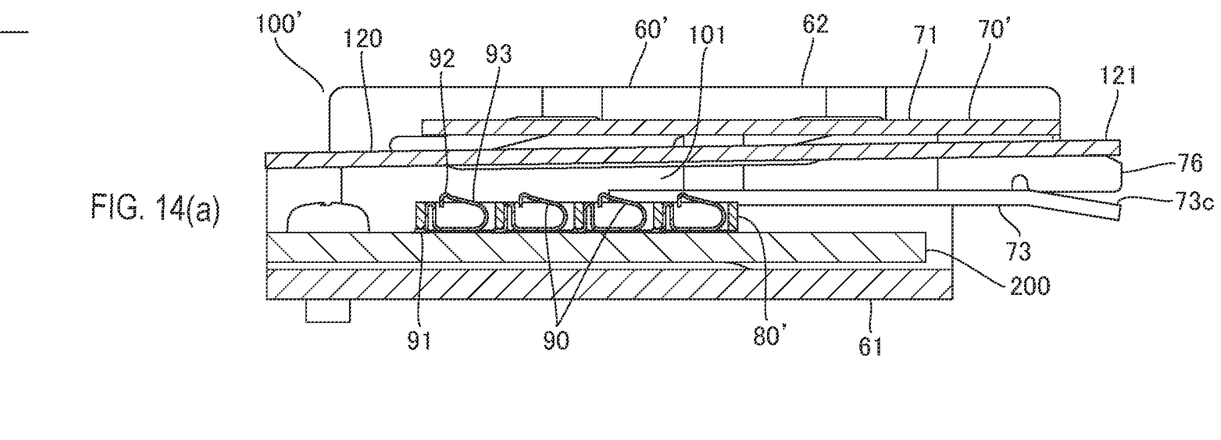
FIG. 14(a) is an E-E line enlarged sectional view of FIG. 10(a)

FIG. 14(a) shows a section (a section in the state shown in FIG. 10) before the insertion of the module substrate 300. As shown in FIG. 14(a), the plate 120 is in an inclined state (oblique state). However, a sufficient insertion space 101 is secured at a rear end portion of the slider 70', and therefore the module substrate 300 can be inserted without problems.

Figure 14B:
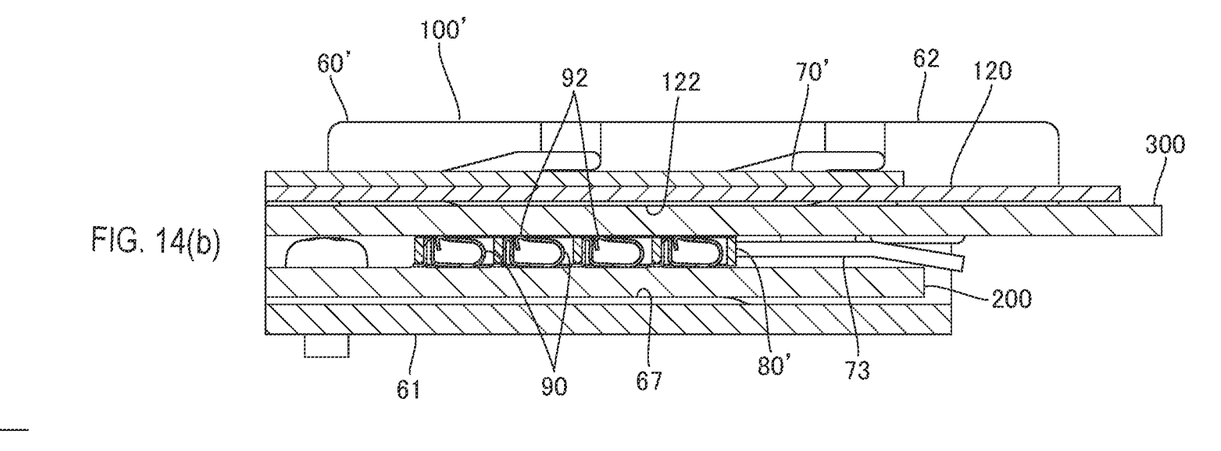
FIG. 14(b) is an E-E line enlarged sectional view of FIG. 13(a).

Similarly to the first embodiment, after the insertion of the module substrate 300, the slider 70' is slid, and the electrodes of the module substrate 300 and the contacts 90 are electrically connected. However, this embodiment has a structure in which the slider 70' presses the module substrate 300 against the contact parts 92 of the contacts 90 through the plate 120. FIG. 14(*b*) shows this state (connection completion state).

In this way, in the connector 100' in the second embodiment, the plate 120 is interposed between the slider 70' and the module substrate 300. Therefore, it is unlikely that the module substrate 300 moves together due to the sliding of the slider 70', and consequently, it is not always necessary that the extending direction of the contact parts 92 of the contacts 90 coincides with the insertion direction of the module substrate 300 as in the case of the first embodiment.

In the second embodiment, the step part 122 that limits the range of the contact with the module substrate 300 is provided on the plate 120, and furthermore the step part 67 that limits the range of the contact with the main substrate 200 is provided on the frame 60'. Therefore, the main substrate 200, the housing 80' and the module substrate 300 are sandwiched between the step parts 122 and 67, and thereby it is possible to obtain a suitable contact force between the electrodes of the module substrate 300 and the contacts 90, and to suitably prevent the deflection of the main substrate 200 and the module substrate 300.

The embodiments of the mode for carrying out the invention have been described above. The cam groove and the projection that constitute the cam mechanism are not limited to the configuration in the first and second embodiments. The cam groove may be provided on the slider, and the projection may be provided on the frame.

What is claimed is:

1. A connector for electrically connecting a module substrate and a main substrate, the module substrate comprising a plurality of electrodes arrayed lengthwise and breadthwise on one surface of the module substrate, the connector comprising:
    a flattened housing being mounted on the main substrate;
    a plurality of contacts being arrayed and held on the flattened housing so as to correspond to the electrodes of the module substrate, the contacts comprising contact parts protruding from an opposing surface of a main substrate mount surface of the flattened housing and connection parts being connected to the electrodes of the main substrate;
    a frame comprising a flat board part positioned on the opposite side of the main substrate to the housing mount surface and a pair of side board parts standing from the flat board part to sandwich the flattened housing mounting portion of the main substrate, and in which one of a cam groove and a projection constituting a cam mechanism is formed on the pair of side board parts; and
    a slider comprising a tabular shape, the other of the cam groove and the projection constituting the cam mechanism being formed at a pair of opposite side portions of the slider, the slider forming an insertion space for the module substrate between the slider and the flattened housing mounted on the main substrate when the projection is inserted into the cam groove and the slider is attached to the frame, wherein
    the slider comprises a structure in which when the slider slides in the same direction as a direction of insertion of the module substrate into the insertion space, the slider is displaced in a direction in which the module substrate inserted into the insertion space is pressed against the contact parts by the cam mechanism, and the main substrate, the flattened housing and the module substrate are sandwiched between the slider and the flat board part.

2. The connector according to claim 1, wherein
    guide parts are provided at the pair of opposite side portions of the slider, the guide parts being capable of supporting both width-directional side edge parts of the one surface of the module substrate that is inserted into the insertion space and guiding the insertion of the module substrate into the insertion space.

3. The connector according to claim 1, wherein
    all the contact parts extend in the direction of the insertion.

4. The connector according to claim 2, wherein
    all the contact parts extend in the direction of the insertion.

5. The connector according to claim 3, wherein
    the contacts comprise spring parts that are bent in a U-shape, and the contact parts are positioned at free end sides of the spring parts.

6. The connector according to claim 1, further comprising a plate comprising a tabular shape, and protrusion parts at four corner parts, wherein:
    the plate is contained between the pair of side board parts, such that the two protrusion parts positioned forward are positioned on cutouts formed at front ends of the pair of side board parts and the two protrusion parts positioned rearward are positioned on support parts formed so as to protrude rearward at rear ends of the pair of opposite side portions of the slider; and
    the slider presses the module substrate against the contact parts through the plate.

7. The connector according to claim 2, further comprising a plate comprising a tabular shape, and protrusion parts at four corner parts, wherein:
    the plate is contained between the pair of side board parts, such that the two protrusion parts positioned forward are positioned on cutouts formed at front ends of the pair of side board parts and the two protrusion parts positioned rearward are positioned on support parts formed so as to protrude rearward at rear ends of the pair of opposite side portions of the slider; and
    the slider presses the module substrate against the contact parts through the plate.

8. The connector according to claim 1, wherein
    a stopper against which the module substrate inserted into the insertion space abuts is provided on the flat board part of the frame.

9. The connector according to claim 2, wherein
    a stopper against which the module substrate inserted into the insertion space abuts is provided on the flat board part of the frame.

10. The connector according to claim 1, wherein:
    the module substrate comprises a cutout at a front end in the direction of the insertion; and
    a convex part that is fit into the cutout and by which a positioning of the module substrate in a width direction is performed is formed on the flattened housing or the frame.

11. The connector according to claim 2, wherein:
    the module substrate includes a cutout at a front end in the direction of the insertion; and a convex part that is fit into the cutout and by which a positioning of the module substrate in a width direction is performed is formed on the flattened housing or the frame.

* * * * *